United States Patent
Ueda (10) Patent No.: US 10,228,014 B2
(45) Date of Patent: Mar. 12, 2019

(54) INTERNAL COMBUSTION ENGINE BEARING AND METHOD OF MANUFACTURING INTERNAL COMBUSTION ENGINE BEARING

(71) Applicant: TAIHO KOGYO CO., LTD., Toyota-shi, Aichi (JP)

(72) Inventor: Tatehito Ueda, Toyota (JP)

(73) Assignee: TAIHO KOGYO CO., LTD. (JP)

(*) Notice: Subject to any disclaimer, the term of this patent is extended or adjusted under 35 U.S.C. 154(b) by 0 days.

(21) Appl. No.: 15/575,995

(22) PCT Filed: May 26, 2016

(86) PCT No.: PCT/JP2016/065578
§ 371 (c)(1),
(2) Date: Nov. 21, 2017

(87) PCT Pub. No.: WO2016/194768
PCT Pub. Date: Dec. 8, 2016

(65) Prior Publication Data
US 2018/0156264 A1 Jun. 7, 2018

(30) Foreign Application Priority Data
Jun. 1, 2015 (JP) .................................. 2015-111731

(51) Int. Cl.
*F16C 9/02* (2006.01)
*F16C 9/00* (2006.01)
(Continued)

(52) U.S. Cl.
CPC ................. *F16C 9/02* (2013.01); *F16C 9/00* (2013.01); *F16C 17/02* (2013.01); *F16C 33/122* (2013.01); *F16C 33/20* (2013.01)

(58) Field of Classification Search
CPC ...... F16C 9/00; F16C 9/02; F16C 9/04; F16C 17/022; F16C 33/1065; F16C 33/20;
(Continued)

(56) References Cited

U.S. PATENT DOCUMENTS

2011/0305410 A1 12/2011 Otsuki et al.
2013/0195388 A1 8/2013 Ishii et al.

FOREIGN PATENT DOCUMENTS

CN 103201531 A 7/2013
DE 102009001364 A1 * 9/2010 ............... F16C 9/02
(Continued)

OTHER PUBLICATIONS

Office Action for Japanese Patent Application No. 2015-111731, dated Sep. 4, 2018 (3 pages) with Machine Translation (3 pages).
(Continued)

*Primary Examiner* — Phillip A Johnson
(74) *Attorney, Agent, or Firm* — Harness, Dickey & Pierce, P.L.C.

(57) ABSTRACT

A semicircular tube-shaped bearing has a bearing main body formed from a resin, an inner circumferential surface that slides over an opposing shaft, and an outer circumferential surface contacting a housing. The semicircular tube-shaped bearing may have a laminated structure including a resin layer and includes at least a portion of the inner circumferential surface, and a reinforcing layer that is in close contact with the resin layer. In this case, the bearing main body has a resin layer that includes the inner circumferential surface, and a reinforcing layer that is in close contact with the resin layer. The reinforcing layer has a higher rigidity than the resin layer, and raises the rigidity of the resin layer by being in close contact with the resin layer. The material forming the reinforcing layer is a metal such as iron, aluminum, or stainless steel.

6 Claims, 7 Drawing Sheets

(51) Int. Cl.
*F16C 17/02* (2006.01)
*F16C 33/20* (2006.01)
*F16C 33/12* (2006.01)

(58) Field of Classification Search
CPC ........ F16C 33/24; F16C 33/28; F16C 33/201; F16C 33/203; F16C 33/205; F16C 33/208; F16C 2360/22
See application file for complete search history.

(56) References Cited

FOREIGN PATENT DOCUMENTS

| EP | 1564426 | A1 * | 8/2005 | ............... F16C 9/00 |
| EP | 2940327 | A1 | 11/2015 | |
| EP | 3029342 | A1 | 6/2016 | |
| FR | 1163360 | A * | 9/1958 | ............... F16C 9/04 |
| GB | 2338995 | A | 1/2000 | |
| JP | 07-119731 | A | 5/1995 | |
| JP | 2000-018253 | A | 1/2000 | |
| JP | 2000-087954 | A | 3/2000 | |
| JP | 2006-170420 | A | 6/2006 | |
| JP | 2008-019880 | A | 1/2008 | |
| JP | 2009-057992 | A | 3/2009 | |
| JP | 2011-235633 | A | 11/2011 | |
| JP | 2012-220011 | A | 11/2012 | |
| JP | 2013-167280 | A | 8/2013 | |
| JP | 2013-245767 | A | 12/2013 | |
| JP | 2014-234860 | A | 12/2014 | |

OTHER PUBLICATIONS

The Extended European Search Report for EP Application No. 16803203.5, dated Oct. 25, 2018 (8 pages).
Chinese Office Action for Application No. 201680030113.3 dated Sep. 30, 2018 with English translation (14 pages).

* cited by examiner

INTERNAL COMBUSTION ENGINE BEARING AND METHOD OF MANUFACTURING INTERNAL COMBUSTION ENGINE BEARING

CROSS-REFERENCE TO RELATED APPLICATIONS

This application is a U.S. National Stage Application of International Application No. PCT/JP2016/065578, filed on May 26, 2016, which claims priority to Japanese Application No. 2015-111731, filed on Jun. 1, 2015. The entire disclosures of the above applications are incorporated herein by reference.

TECHNICAL FIELD

The present invention relates to a bearing for use in an internal combustion engine of an automobile or the like.

BACKGROUND ART

A bearing that employs bimetal, which has a lining layer made of a copper-based or an aluminum-based bearing alloy on a metal backing made of steel or the like, is known as a so-called main bearing or connecting rod bearing used in an internal combustion engine (engine) of an automobile or the like (e.g., see JP 2013-167280). Also, although not for use in an internal combustion engine, a bearing made of resin is known as a bearing for use in office equipment or the like (e.g., see JP 2008-019880 and JP 2000-087954).

One characteristic that is desired for an internal combustion engine in an automobile is an increase in the speed of rise in lubricant temperature during cold starting, or in other words an improvement in the so-called high warm-up characteristic. However, when using a bearing made of metal as described in JP 2013-167280, heat escapes from the lubricant via the bearing due to the relatively high thermal conductivity thereof, and there has been a problem in that the temperature of the lubricant does not rise easily. The bearings described in JP 2008-019880 and JP 2000-087954 are used in a non-lubricated environment such as in office equipment, and have had the problem of not being able to be used as bearings for an internal combustion engine that are used along with a lubricant.

In view of this, the present invention relates to technology for improving mainly the warm-up characteristic with a bearing for an internal combustion engine.

SUMMARY

In one aspect, the present invention provides an internal combustion engine bearing including: a bearing main body formed with a semicircular tube shape or a circular tube shape and having an inner circumferential surface that is to slide over a shaft and an outer circumferential surface that is to come into contact with a housing, wherein the bearing main body has a resin layer that is made of a resin, and a reinforcing layer that is made of a metal, is in contact with the resin layer, and reinforces the resin layer.

A configuration is possible in which the resin layer forms at least a portion of the inner circumferential surface, the reinforcing layer has end portions of the inner circumferential surface on two sides in a rotation axis direction of the shaft, and the inner circumferential surface included in the resin layer is sandwiched by the end portions.

A configuration is possible in which the resin layer forms at least a portion of the outer circumferential surface, the reinforcing layer has end portions of the outer circumferential surface on two sides in a rotation axis direction of the shaft, and the outer circumferential surface included in the resin layer is sandwiched by the end portions.

A configuration is possible in which the bearing main body is formed with a semicircular tube shape and has a mating surface that is to come into contact with another bearing that forms a pair, and the reinforcing layer is exposed at the mating surface.

A configuration is possible in which the resin layer covers an entirety of a surface of the reinforcing layer.

Also, the present invention provides a method of manufacturing an internal combustion engine bearing, including: a step of forming a reinforcing layer by processing a metal; and a step of forming a resin layer by coating an entirety of a surface of the reinforcing layer with the resin.

Also, the present invention provides a method of manufacturing an internal combustion engine bearing, including: a step of arranging a reinforcing layer that includes a metal into a portion of an interior space of a mold; and a step of forming a resin layer by injecting a resin between the mold and the reinforcing layer.

Advantageous Effects of Invention

According to the present invention, it is possible to improve the warm-up characteristic with a bearing for an internal combustion engine. Also, it is possible to improve the mechanical strength compared to the case where the internal combustion engine bearing is entirely made of a resin.

DETAILED DESCRIPTION

1. Structure

Figure 1:
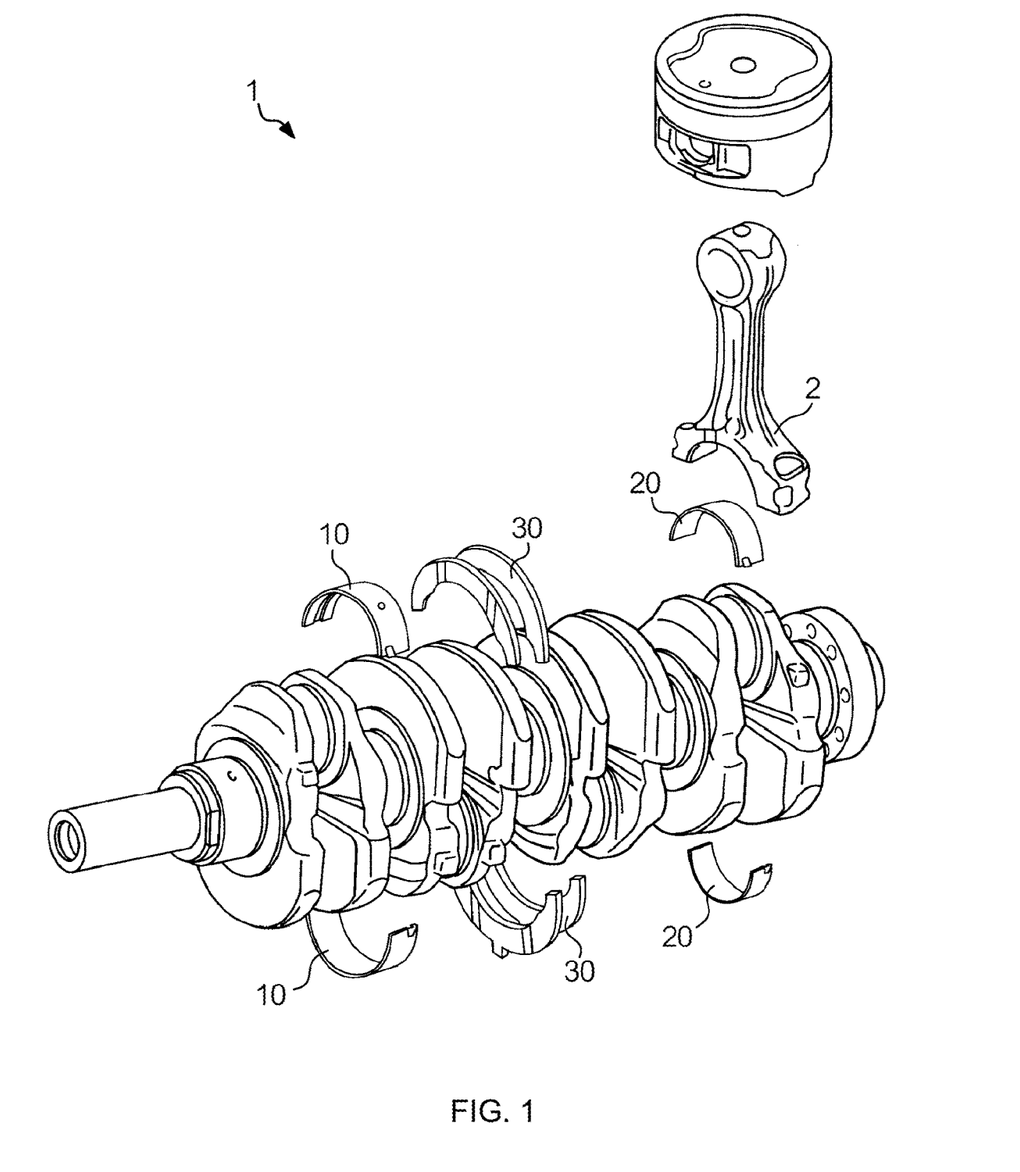
FIG. 1 is a diagram illustrating crankshaft 1 in an internal combustion engine.

FIG. 1 is a diagram illustrating crankshaft 1 in an internal combustion engine. Crankshaft 1 includes main bearing 10, connecting rod bearing 20, and crank washer 30. Main bearing 10 is a bearing that is attached to the housing (not shown) of a cylinder block (not shown), grips a journal of crankshaft 1, and supports crankshaft 1. Connecting rod bearing 20 is a bearing that is attached to connecting rod 2, grips a pin of crankshaft 1, and supports connecting rod 2. Crank washer 30 is a bearing that is used in combination with main bearing 10 and supports force in the axial direction of crankshaft 1. Crank washer 30 also has a function of positioning crankshaft 1 and the cylinder block in the axial direction.

Figure 2:
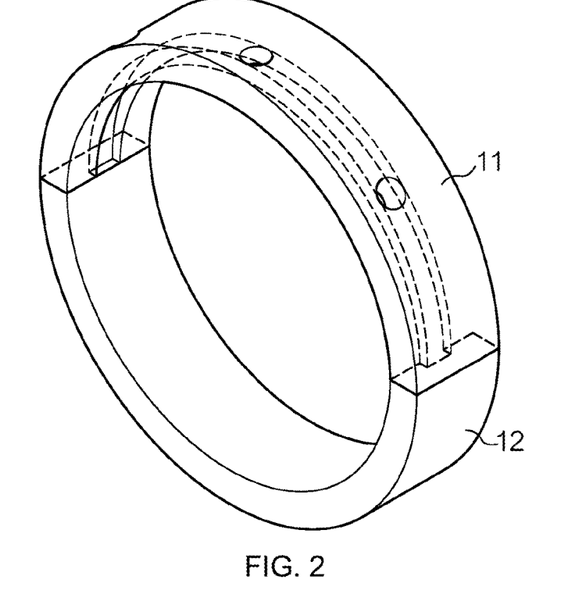
FIG. 2 is a diagram illustrating an external view of main bearing 10.

FIG. 2 is a diagram illustrating an external view of main bearing 10. Main bearing 10 is constituted by two semicircular tube-shaped bearings (semicircular tube-shaped bearing 11 and semicircular tube-shaped bearing 12). Semicircular tube-shaped bearing 11 is a bearing (upper bearing) that is attached on the piston side in a view from crankshaft 1, and semicircular tube-shaped bearing 12 is a bearing (lower bearing) that is attached on the opposite side. Semicircular tube-shaped bearing 11 and semicircular tube-shaped bearing 12 are examples of an internal combustion engine bearing according to the present invention.

Figure 3:
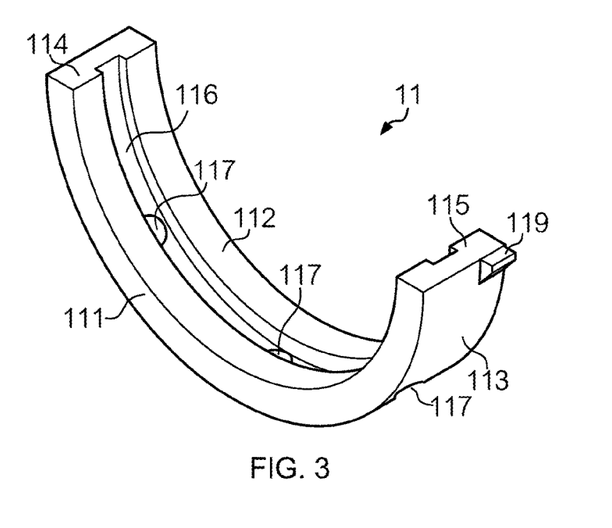
FIG. 3 is a diagram illustrating an external view of semicircular tube-shaped bearing 11.

FIG. 3 is a diagram illustrating an external view of semicircular tube-shaped bearing 11. Semicircular tube-shaped bearing 11 has bearing main body 111. In this example, bearing main body 111 is made of a resin and a metal. A thermosetting resin or a thermoplastic resin is used as the resin.

Examples of the thermosetting resin include thermosetting polyimide resin (PI), phenol resin (PF), urea resin (UF), melamine resin (MF), epoxy resin (EP), furan resin (FF), xylene resin (XF), alkyd resin (UP), silicone resin (SI), allyl resin (PDAP), and a material obtained by mixing fibers (glass fibers or carbon fibers) in these types of resin (so-called fiber-reinforced plastic (fiber reinforced resin), FRP).

Examples of the thermoplastic resin include polyvinyl chloride resin (PVC), polyvinylidene chloride resin (PVdC), polyvinyl alcohol resin (PVA), polystyren resin (PS), acrylonitrile styrene resin (AS), acrylonitrile-butadiene-styrene resin (ABS), polyethylene resin (PE), ethylene vinyl acetate copolymer resin (EVA), polypropylene resin (PP), polyacetal resin (POM), polymethylmethacrylate resin (PMMA), modified acrylic resin (MS), cellulose acetate resin (CA), polycarbonate resin (PC), polyester resin (PET, PTT, PBT, PEN, PBN), polyamide resin (PA), polyurethane resin (PU), fluoric resin (PTFE, FEP, PFA, etc.), polyamide-imide resin (PAI), polyphenylene sulfide (PPS), polyetheretherketone (PEEK), thermoplastic polyimide (TPI), polybenzimidazole (PBI), polyetherimide resin (PEI), polysulfone resin (PSF), polyethersulfone resin (PES), and polyarylate resin (PAR).

Due to being used in an internal combustion engine, the heat resistant temperature (e.g., continuous use temperature) of the resin is preferable greater than or equal to 180° C., and more preferably greater than or equal to 200° C. Also, from the viewpoint of improving the warm-up characteristic, the thermal conductivity of the resin is preferably less than or equal to 1 W/mK, and more preferably less than or equal to 0.5 W/mK. Also, in order to avoid adverse effects caused by moisture absorption, such as change in dimensions, the moisture absorption of the resin is preferably less than or equal to 0.2%. In the case of thermoplastic resin in particular, there is a problem that the glass transition point decreases due to moisture absorption, and therefore the moisture absorption is preferably less than or equal to 0.2%. Furthermore, from the viewpoint of suppressing expansion in the cylinder block, the coefficient of linear expansion of the resin is preferably less than or equal to $70 \times 10^{-6}$.

Bearing main body 111 is formed so as to include a resin, and therefore compared to the case where the bearing main body is entirely made of a metal, heat less easily escapes from the lubricant to the housing via the bearing, and it is possible to improve the speed of rise in the lubricant temperature when the engine is cold started.

Bearing main body 111 is molded with a semicircular tube shape, and has inner circumferential surface 112 (sliding surface) that slides over crankshaft 1, and outer circumferential surface 113 that is in contact with the housing (not shown). The diameter φ of crankshaft 1 is 30 to 150 mm for example, and bearing main body 111 has an inner diameter that conforms to the diameter of crankshaft 1. Furthermore, bearing main body 111 has mating surface 114 and mating surface 115 that are in contact with semicircular tube-shaped bearing 12.

In this example, semicircular tube-shaped bearing 11 has oil groove 116 in inner circumferential surface 112. Oil groove 116 is a groove for supplying lubricant to the sliding surface and also holding supplied lubricant. Also, oil groove 116 is provided with at least one oil hole 117 that penetrates from outer circumferential surface 113 to inner circumferential surface 112. A portion of crankshaft 1 that is supported by semicircular tube-shaped bearing 11 is provided with an oil hole (not shown) at a position opposing oil groove 116. This oil hole penetrates to a portion of crankshaft 1 that is supported by connecting rod bearing 20. Lubricant is supplied to outer circumferential surface 113 of semicircular tube-shaped bearing 11 via an oil passage (not shown) that is provided in the cylinder block. Lubricant that has been supplied to outer circumferential surface 113 is supplied to inner circumferential surface 112 (sliding surface) via oil hole 117, and lubricates the main bearing. The lubricant on the sliding surface is supplied to the sliding surface of connecting rod bearing 20 via the oil hole of crankshaft 1.

Figure 4A:
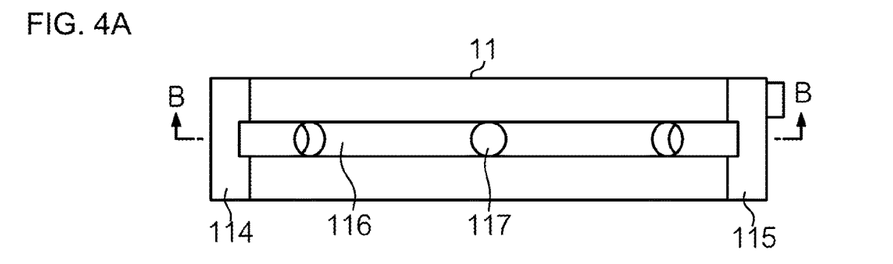
FIGS. 4A and 4B are diagrams illustrating a cross-sectional structure of semicircular tube-shaped bearing 11.
Figure 4B:
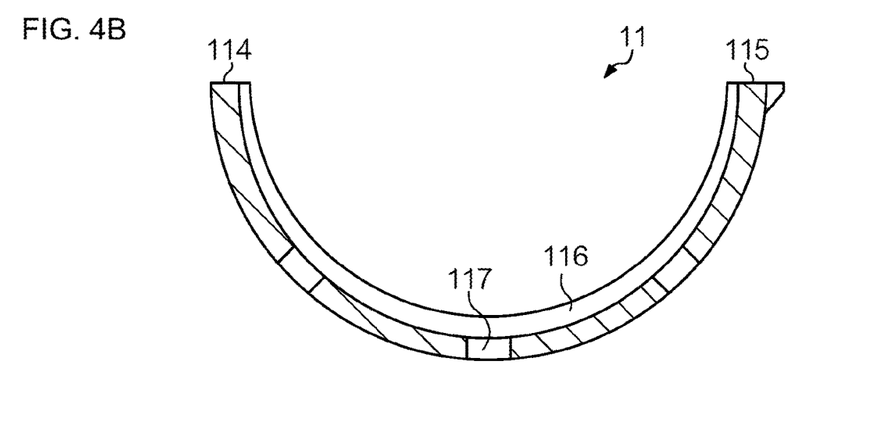

FIG. 4 is a diagram illustrating the cross-sectional structure of semicircular tube-shaped bearing 11. FIG. 4(A) is an external view of semicircular tube-shaped bearing 11 seen from a direction perpendicular to the mating surfaces. FIG. 4(B) is a cross-sectional view taken along B-B in FIG. 4(A). This cross-section is a cross-section that is perpendicular to the axial direction (a cross-section that is parallel to the sliding direction). In this example, in this cross-section, the wall thickness of bearing main body 111 is not uniform, but rather increases in thickness toward the central portion, and decreases in thickness from the central portion toward the end portions (mating surfaces). This configuration is employed such that the center of the inner diameter circle (circle described by inner circumferential surface 112) is eccentric (shifted) outward from the center of the outer diameter circle (circle described by outer circumferential surface 113). A so-called oil relief is formed by this eccentricity. Oil relief refers to the gap between the inner circumferential surface and a circle based on the central portion of the inner circumferential surface of the semicircular tube-shaped bearing (a circle that passes through the central portion of the inner circumferential surface). The depth (amount) of the oil relief is measured based on a predetermined height (e.g., 6 to 13 mm) from the mating surfaces, and is 0.005 to 0.025 mm for example. The oil relief expands the oil clearance in the vicinity of the mating surfaces, and aids the formation of wedge film pressure. Also, the oil relief furthermore aids the formation of an oil film, and cools the bearing by increasing the amount of oil.

Also, in this example, oil groove 116 is formed so as to extend the entire length in the sliding direction, from mating surface 114 to mating surface 115. The depth of the oil groove is also not uniform, but rather increases in depth toward the central portion of bearing main body 111, and decreases in depth from the central portion toward the mating surfaces.

Furthermore, bearing main body 111 is provided with a crush relief. Crush relief refers to a "relief" provided over the entire width of bearing main body 111 in portions of inner circumferential surface 112 that are adjacent to mating surface 114 and mating surface 115.

Figure 5:
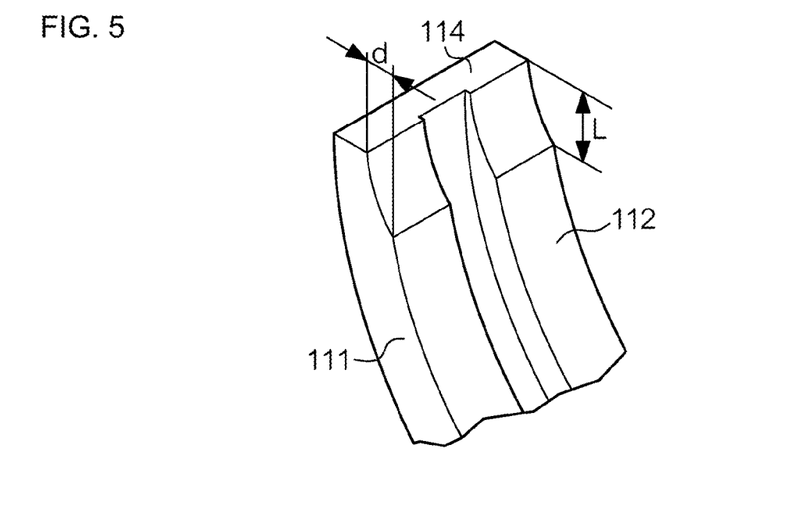
FIG. 5 is a diagram illustrating a crush relief.

FIG. 5 is a diagram illustrating a crush relief. Note that in order to facilitate the description, the crush relief is illustrated in an exaggerated manner compared to an actual crush relief. Depth d of the crush relief is the difference between the position of inner circumferential surface 112 and a circle described by the portion of inner circumferential surface 112 other than the crush relief at the position of the mating surface, and length L of the crush relief is the length of the portion of inner circumferential surface 112 in which the crush relief is formed. Depth d of the crush relief is 0.01 to 0.06 mm for example, and length L of the crush relief is 4 to 9.5 mm for example. When the bearing is attached to the housing, even if a portion of inner circumferential surface 112 in the vicinity of a mating surface falls slightly toward the opposing shaft, the crush relief prevents contact with the shaft. The crush relief also has an effect of cooling the bearing by discharging lubricant in the vicinity of the mating surfaces, and an effect of discharging foreign matter that has penetrated to the sliding surface.

Figure 6:
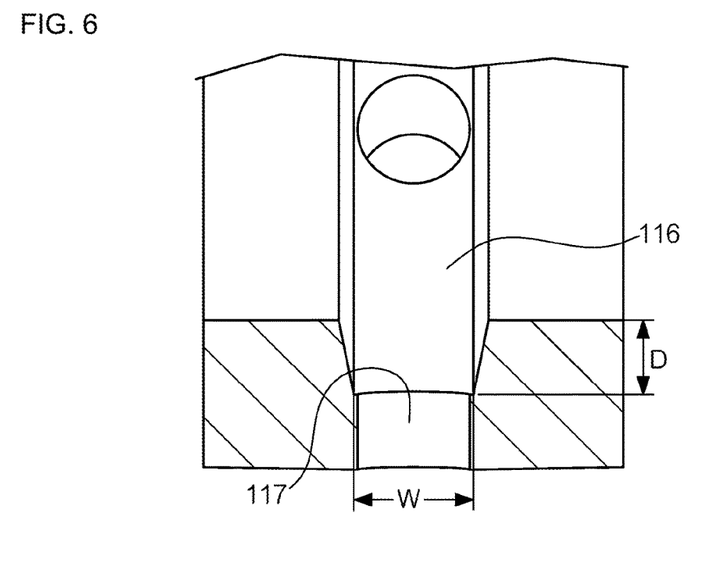
FIG. 6 is a diagram illustrating a cross-sectional structure of oil groove 116 and oil hole 117.

FIG. 6 is a diagram illustrating the cross-sectional structure of oil groove 116 and oil hole 117. FIG. 6 shows a cross-section that is perpendicular to the sliding direction (a cross-section that is parallel to the axial direction). In this cross-section, oil groove 116 has a trapezoid shape in which the bottom portion is narrower and the opening portion is wider. Bottom width W of oil groove 116 is 2 to 5 mm for example, and depth d of oil groove 116 is smaller than bottom width W, such as 0.5 to 1 mm.

In this example, fine grooves (microgrooves) that are finer than oil groove 116 are formed in a portion of inner circumferential surface 112 other than oil groove 116.

Figure 7:
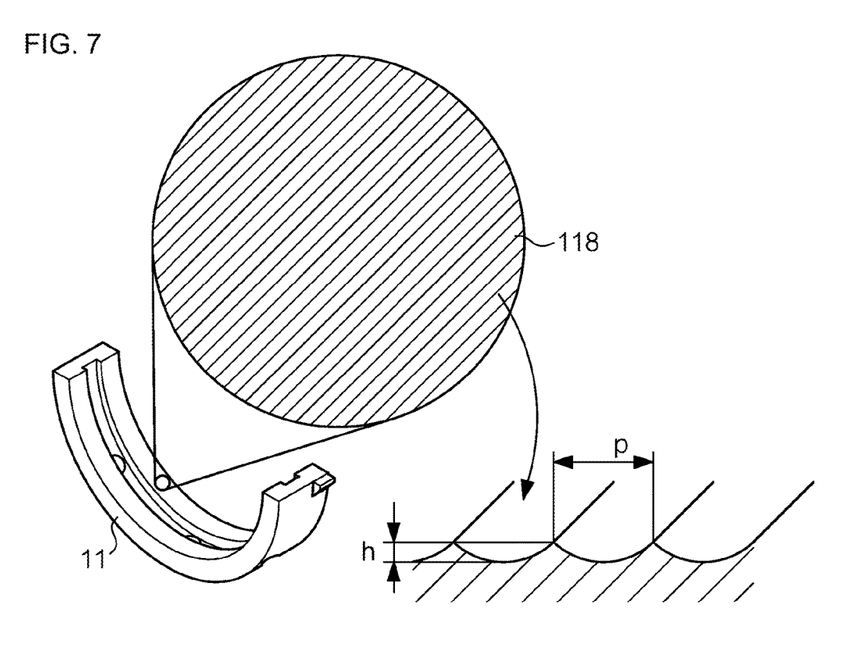
FIG. 7 is a diagram illustrating fine grooves 118 formed in inner circumferential surface 112.

FIG. 7 is a diagram illustrating fine grooves 118 formed in inner circumferential surface 112. Fine grooves 118 are grooves that have a circular arc-shaped cross-section and are arranged regularly. In this example, the apex between two adjacent grooves has a sharp shape rather than being flat. The gap between two adjacent apexes is referred to as pitch P, and the depth of the grooves based on the apex is referred to as depth h. Pitch P of fine grooves 118 is larger than depth h thereof. Depth h is preferably 1 to 20 μm, and more preferably 1 to 6 μm, for example. Pitch P is preferably 0.1 to 0.4 mm, and more preferably 0.1 to 0.2 mm, for example. Fine grooves 118 shorten the time required to move from a non-lubrication state to a fluid lubrication state in a so-called Stribeck chart, thus ensuring early arrival of the fluid lubrication state and improving conformability and oil retainability.

Also, bearing main body 111 has interference (so-called crush). In other words, bearing main body 111 has a longer diameter than a semicircle.

The description will now return to FIG. 3. Semicircular tube-shaped bearing 11 has claw 119 on outer circumferential surface 113. Claw 119 is an example of a rotation prevention protrusion portion for suppressing rotation of semicircular tube-shaped bearing 11 relative to the housing. Furthermore, claw 119 has functions of preventing erroneous attachment and performing positioning in the circumferential direction and the axial direction.

Also, semicircular tube-shaped bearing 11 has so-called bulge. Bulge refers to setting the outer diameter dimension larger than the inner diameter of the housing in the free state (not attached to the housing) in a view from the axial direction. This bulge is 0.8 to 1.3 mm for example. Bulge has an effect of allowing the outer circumference of semicircular tube-shaped bearing 11 to conform to the inner circumference of the housing during attaching, and has an effect of preventing semicircular tube-shaped bearing 11 from moving away from or falling out of the housing during attachment.

A detailed description will not be given for semicircular tube-shaped bearing 12, which is the same as semicircular tube-shaped bearing 11 with the exception of not having an oil groove or an oil hole. A detailed description will not be given for connecting rod bearing 20 either, which is the same as main bearing 10 in that two semicircular tube-shaped bearings are used in a combined state. It should be noted that in connecting rod bearing 20, neither of the semicircular tube-shaped bearings has an oil groove or an oil hole. The two semicircular tube-shaped bearings of connecting rod bearing 20 are other examples of an internal combustion engine bearing according to the present invention.

Figure 8:
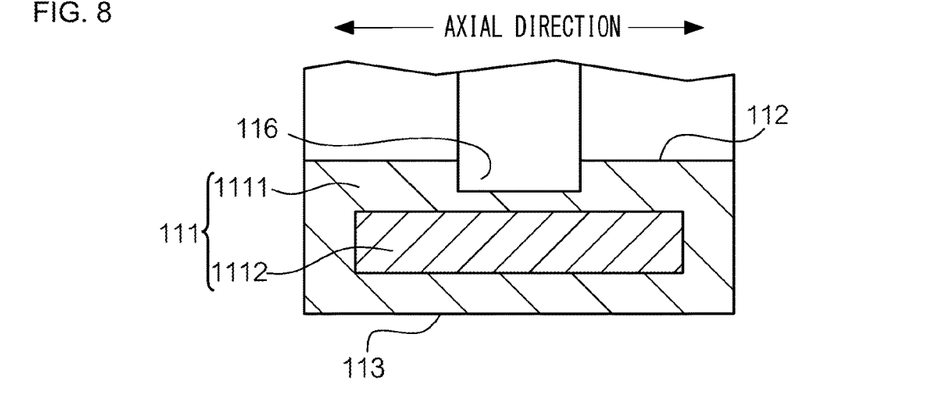
FIG. 8 is a conceptual diagram for describing an example of a laminated structure of semicircular tube-shaped bearing 11.

Also, bearing main body of semicircular tube-shaped bearing 11 and semicircular tube-shaped bearing 12 may have a laminated structure including a resin layer that is made of a resin and includes at least a portion of the inner circumferential surface, and a reinforcing layer that is formed in close contact with the resin layer and reinforces the resin layer. FIG. 8 is a conceptual diagram for describing an example of the laminated structure of semicircular tube-shaped bearing 11. Oil holes 117 have been omitted from FIG. 8. Note that the laminated structure of semicircular tube-shaped bearing 11 shown in FIG. 8 applies to semicircular tube-shaped bearing 12 as well.

As shown in FIG. 8, bearing main body 111 has resin layer 1111 that includes at least a portion of inner circumferential surface 112, and reinforcing layer 1112 that is formed so as to be in contact with resin layer 1111. It is preferable that resin layer 1111 and reinforcing layer 1112 are in close contact. Resin layer 1111 is made of a resin. Reinforcing layer 1112 is made of a material that has a higher rigidity than the resin that forms resin layer 1111, and raises the rigidity of resin layer 1111 by being formed in close contact with resin layer 1111. The material forming reinforcing layer 1112 is a monometal such as iron, aluminum, or stainless steel, or an alloy thereof. The material forming reinforcing layer 1112 may also include a material other than a monometal or an alloy.

Reinforcing layer 1112 may be obtained by using roller bending processing or the like to process a metal flat plate into a semicircular tube shape, or may be obtained by a plate having a hollow portions, such as a metal mesh or perforated metal, being processed into a semicircular tube shape.

Resin layer 1111 shown in FIG. 8 is formed so as to cover the entirety of the surface of reinforcing layer 1112. This resin layer 1111 may be formed by performing coating processing on the surface of reinforcing layer 1112. It may also be formed by injecting a resin onto the surface of reinforcing layer 1112 that has been arranged in a mold. It may also be formed by compressing a resin that has been injected between the surface of reinforcing layer 1112 and a machining device.

Figure 9A:
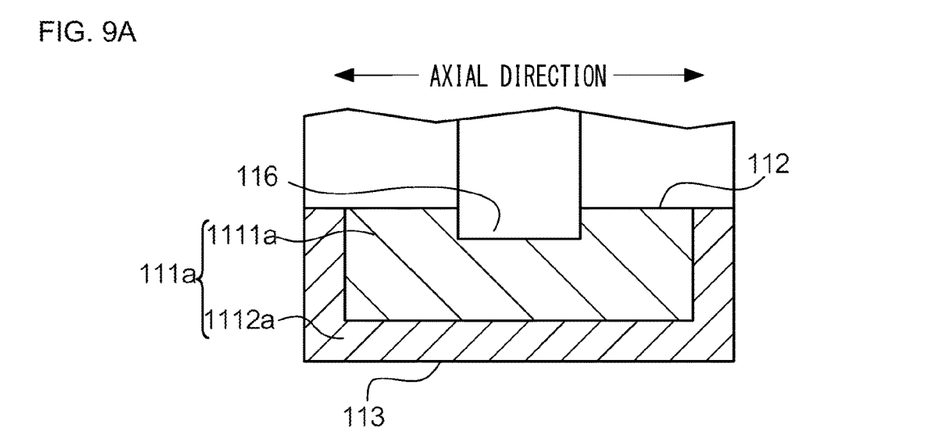
FIGS. 9A and 9B are conceptual diagrams for describing another example of a laminated structure of semicircular tube-shaped bearing 11.

The laminated structure of semicircular tube-shaped bearing 11 is not limited to the structure shown in FIG. 8. FIG. 9 is a conceptual diagram for describing another example of the laminated structure of semicircular tube-shaped bearing 11. As shown in FIG. 9(A), bearing main body 111a of semicircular tube-shaped bearing 11 has reinforcing layer 1112a and resin layer 1111a.

Reinforcing layer 1112a includes end portions of inner circumferential surface 112 on two sides in a direction (axial direction) extending along the crankshaft 1 (opposing shaft). Also, inner circumferential surface 112 included in resin layer 1111a is configured to be sandwiched from two sides in the axial direction by the two end portions of reinforcing layer 1112a described above.

Accordingly, even if force acts in the axial direction at the sliding surfaces of crankshaft 1 and inner circumferential surface 112, resin layer 1111a is sandwiched by portions of reinforcing layer 1112a, and therefore is less easily damaged than a resin layer having an inner circumferential surface that is not sandwiched by portions of reinforcing layer 1112a.

Figure 9B:
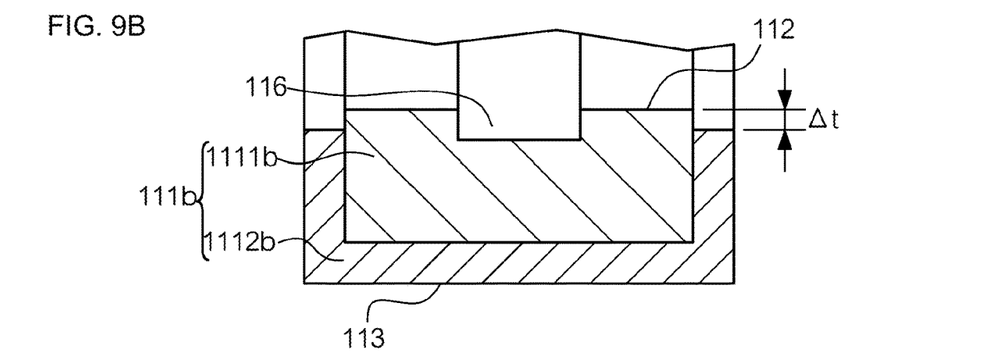

Also, as shown in FIG. 9(B), the resin layer may protrude farther toward the opposing shaft than the reinforcing layer does. Bearing main body 111b of semicircular tube-shaped bearing 11 shown in FIG. 9(B) has reinforcing layer 1112b and resin layer 1111b.

Two portions of reinforcing layer 1112b shown in FIG. 9(B) that sandwich resin layer 1111b from two sides in the axial direction are farther from the shaft than inner circumferential surface 112 by Δt, and do not reach inner circumferential surface 112. For this reason, reinforcing layer 1112b does not constitute inner circumferential surface 112 and does not come into contact with or slide on crankshaft 1. In contrast, resin layer 1111b protrudes farther toward crankshaft 1 than reinforcing layer 1112b does, and thus comes into contact with and slides on crankshaft 1.

Accordingly, heat does not directly escape from crankshaft 1 to an external portion through reinforcing layer 1112b. Also, there are no sliding portions between crankshaft 1 and reinforcing layer 1112b, thus preventing crankshaft 1 and reinforcing layer 1112b from shaving against each other, and preventing shavings from inhibiting sliding of the resin layer and the crankshaft.

Note that although oil groove 116 is provided in the resin layer and does not reach the reinforcing layer in FIGS. 8 and 9, the bottom portion of oil groove 116 may reach the reinforcing layer. Also, oil groove 116 may be provided in the reinforcing layer instead of in the resin layer.

Figure 10:
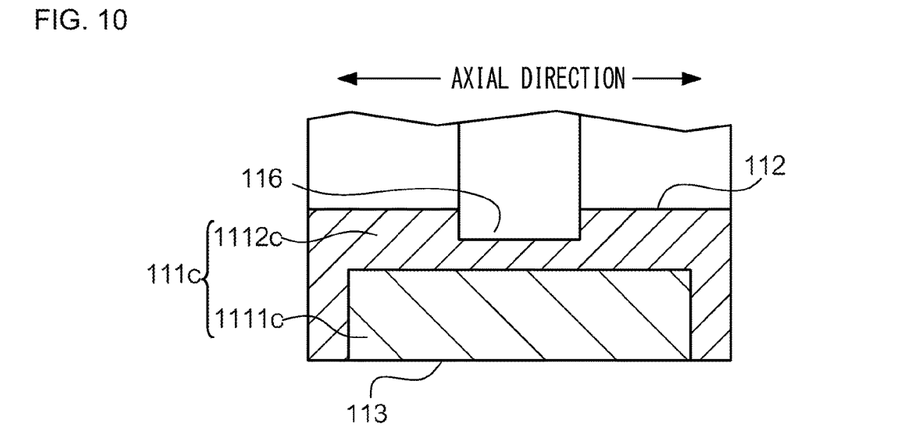
FIG. 10 is a conceptual diagram for describing another example of a laminated structure of semicircular tube-shaped bearing 11.

FIG. 10 is a conceptual diagram for describing another example of the laminated structure of semicircular tube-shaped bearing 11. Bearing main body 111c of semicircular tube-shaped bearing 11 shown in FIG. 10 has reinforcing layer 1112c and resin layer 1111c.

Resin layer 1111c shown in FIG. 10 includes at least a portion of outer circumferential surface 113. Reinforcing layer 1112c includes inner circumferential surface 112, and oil groove 116 is provided in reinforcing layer 1112c. Reinforcing layer 1112c includes end portions of outer circumferential surface 113 on two sides in the axial direction. Also, outer circumferential surface 113 included in resin layer 1111c is configured to be sandwiched from two sides in the axial direction by the two end portions of reinforcing layer 1112c described above.

According to this configuration, heat is transmitted along a path from crankshaft 1 to reinforcing layer 1112c via inner circumferential surface 112, and then to an external portion such as the housing, and the cross-sectional area of this path is smaller due resin layer 1111c, and therefore heat less easily escapes to an external portion compared to the case where the bearing main body is entirely made of the reinforcing layer (i.e., a metal). Note that in this case, it is desirable that the portion of reinforcing layer 1112c that slides on crankshaft 1 is coated with a resin in order to improve sliding performance.

Figure 11:
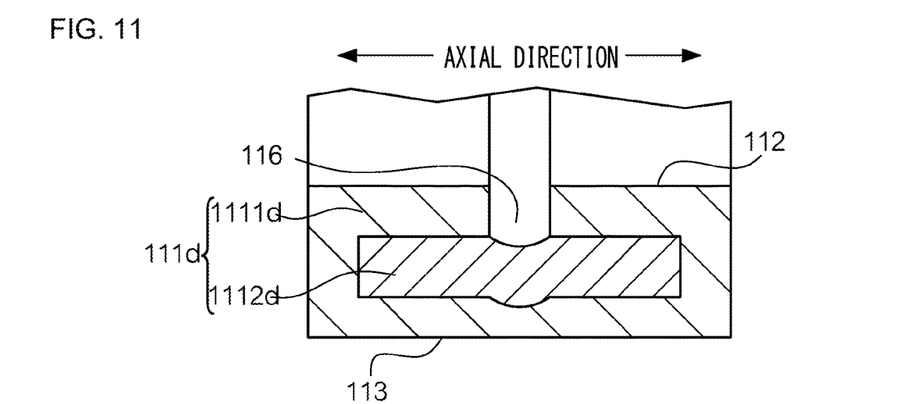
FIG. 11 is a conceptual diagram for describing another example of a laminated structure of semicircular tube-shaped bearing 11.

Also, FIG. 11 is a conceptual diagram for describing another example of the laminated structure of semicircular tube-shaped bearing 11. Bearing main body 111d of semicircular tube-shaped bearing 11 shown in FIG. 11 has reinforcing layer 1112d and resin layer 1111d. Reinforcing layer 1112d is obtained by using pressing processing or the like to form a bead shape in the center of a metal flat plate, and then using roller bending processing or the like to form the plate into a semicircular tube shape. The bead shape formed in reinforcing layer 1112d is formed by pressing from the inner circumferential surface 112 side toward the outer circumferential surface 113 side, such that a recessed portion is formed on the inner circumferential surface 112 side, and a protruding portion is formed on the outer circumferential surface 113 side.

Resin layer 1111d is formed so as to cover the entirety of the surface of reinforcing layer 1112d. As described above, this resin layer 1111d may also be formed by performing coating processing on the surface of reinforcing layer 1112d, or may be formed by injecting a resin on the surface of reinforcing layer 1112d that has been arranged in a mold. Also, it may be formed by compressing a resin that has been injected between the surface of reinforcing layer 1112d and a machining device.

Figure 12:
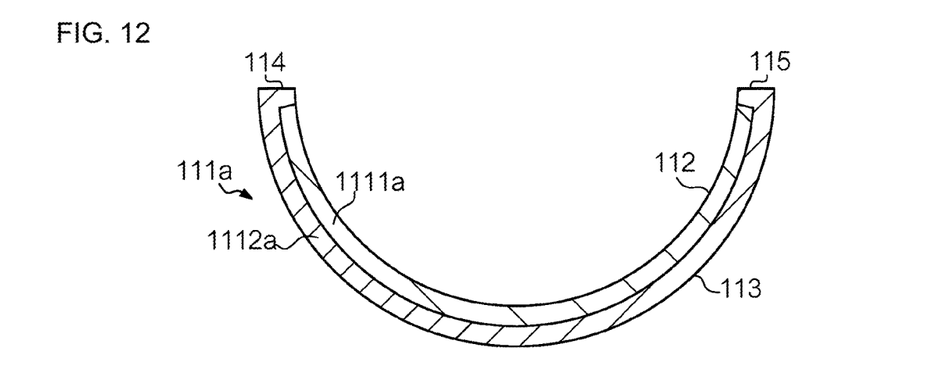
FIG. 12 is a conceptual diagram for describing another example of a laminated structure of semicircular tube-shaped bearing 11.

Also, FIG. 12 is a conceptual diagram for describing another example of the laminated structure of semicircular tube-shaped bearing 11. Oil groove 116 and oil holes 117 have been omitted from FIG. 12. In FIG. 12, bearing main body 111a shown in FIG. 9(A) is seen from the axial direction. As shown in FIG. 12, reinforcing layer 1112a is exposed at mating surface 114 and mating surface 115, and may cover resin layer 1111a. According to this configuration, compression load caused by interference is borne by reinforcing layer 1112a, thus making it possible to ensure load bearing of bearing main body 111a.

2. Manufacturing Method

Several methods can be applied as methods for manufacturing main bearing 10 and connecting rod bearing 20.

2-1. First Example

In this example, bearings are manufactured one at a time by forming a reinforcing layer with a semicircular tube shape or the like by roller bending processing or the like, and then forming a resin layer along the reinforcing layer by injection molding, compression molding, or the like. The oil groove, oil holes, and fine grooves may be molded by forming an oil groove, oil holes, and fine grooves in the mold in advance, or may be formed by performing cutting or the like after molding into the semicircular tube shape.

2-2. Second Example

Figure 13A:
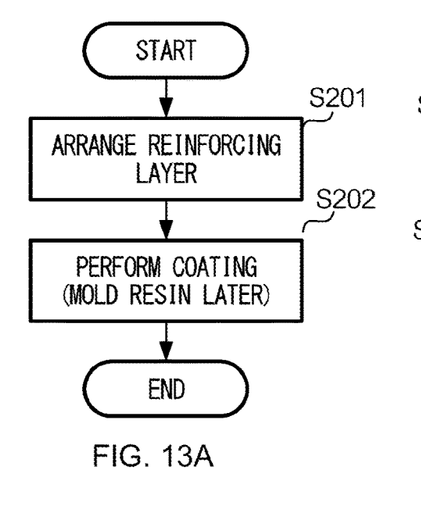
FIGS. 13A and 13B are flowcharts showing a bearing manufacturing method according to a second example.

FIG. 13 is a flowchart showing a bearing manufacturing method according to a second example. As shown in FIG. 13(A) for example, a bearing may be molded by performing coating on a reinforcing layer. In step S201 in FIG. 13(A), a reinforcing layer, which is a metal plate that has been formed into a semicircular tube shape by roller bending processing or the like, is arranged at a predetermined position. Then, in step S202, a resin layer is molded by coating the surface of the reinforcing layer with a resin.

Figure 13B:
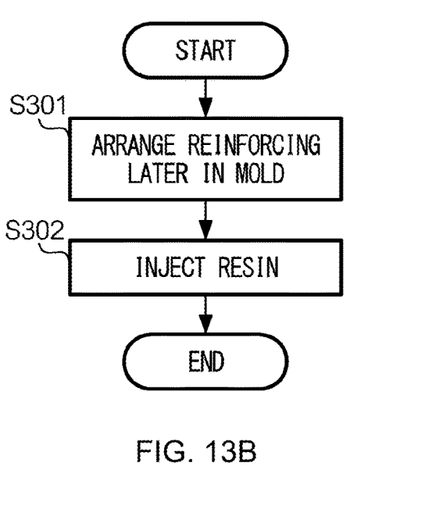

Also, a bearing may be molded by performing injection molding or compression molding with a resin and a mold in which a reinforcing layer has been arranged as shown in FIG. 13(B), for example. In step S301 in FIG. 13(B), a reinforcing layer is arranged in one portion of the interior space of a mold. Then, in step S302, a resin is injected or compressed between the mold and the reinforcing layer. Accordingly, the resin fills a portion not occupied by the reinforcing layer in the interior space of the mold, and a resin layer is formed. This resin layer includes inner circumferential surface 112.

Also, besides coating, injection molding, and compression molding, the molding in step S202 or step S302 may be sheet forming. Here, "sheet forming" is a solid member manufacturing method that has a step in which a material containing resin is stirred in water to produce a slurry, a step in which the produced slurry is dehydrated, and a step in which the dehydrated slurry is molded by being pressed and heated in a mold.

Figure 14:
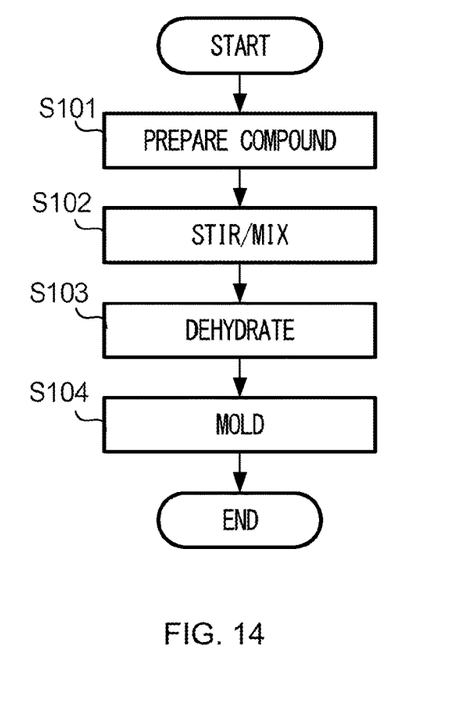
FIG. 14 is a flowchart showing a method of molding resin by sheet forming.

FIG. 14 is a flowchart showing a method of molding resin by sheet forming. In step S101 shown in FIG. 14, a material containing resin is prepared as a compound. This material contains a thermosetting resin or a thermoplastic resin, as well as glass fibers, carbon fibers, inorganic fibers, an inorganic filler, a friction adjusting material, or the like.

In step S102, the above-described material is introduced into water and stirred or mixed to produce a slurry.

In step S103, the above-described slurry is supplied to a filter and dehydrated. Suction filtration, pressure filtration, or the like is applied as dehydration.

In step S104, the above-described dehydrated slurry is supplied to a mold and then pressed and heated, thus being molded into a predetermined shape, such as a semicircular tube shape.

When the resin molded body is molded by the sheet forming steps of step S101 to step S104 shown in FIG. 14, the material is more readily distributed evenly than in the case where another process is applied. Also, in the case where the material contains fibers, the fibers are not likely to be aligned in a specific direction, thus making it possible to give isotropy to the strength of the resin molded body, and to improve the strength.

3. Variations

The present invention is not limited to the embodiment described above, and various modifications can be carried out. The following describes several variations. Two or more of the following variations may be used in combination.

The specific shape of the bearing is not limited to the shape illustrated in the embodiment. For example, at least one of the oil groove, the oil holes, the fine grooves, the oil relief, the crush relief, and the claw may be omitted. Alternatively, at least one of an oil groove and oil holes may be provided in semicircular tube-shaped bearing 12 and connecting rod bearing 20. Also, the specific sizes of these elements are not limited to the sizes illustrated in the embodiment. Moreover, the specific shapes, number of, and positions of the oil groove and the oil holes are not limited to those illustrated in the embodiment. Furthermore, the semicircular tube-shaped bearing is not required to have a bulge.

In the embodiment, an example is described in which oil groove 116 extends from mating surface 114 to mating surface 115. However, the oil groove may be formed in only a portion in the circumferential direction. Also, the oil groove is not limited to being formed in the sliding surface (inner circumferential surface), and may be formed in the outer circumferential surface. In other words, it is sufficient that the oil groove is formed in at least one of the inner circumferential surface and the outer circumferential surface of the bearing main body.

Although semicircular tube-shaped bearing 11 and semicircular tube-shaped bearing 12 are described as examples of a bearing according to the present invention in the embodiment, the bearing is not limited to being a semicircular tube-shaped bearing. The bearing according to the present invention may be a circular tube-shaped bearing (so-called bushing), for example. In this case, the bearing main body that constitutes this bearing has a circular tube shape. Note that here, the circular tube-shaped bearing may be provided with a flange at any portion of the outer circumferential surface, such as an end portion in the axial direction (so-called flanged bushing).

The invention claimed is:

1. An internal combustion engine bearing comprising:
    a bearing main body formed with a semicircular tube shape or a circular tube shape and having an inner circumferential surface that is to slide over a shaft and an outer circumferential surface that is to come into contact with a housing,
    wherein the bearing main body has
        a resin layer that is made of a resin, and
        a reinforcing layer that is made of a metal, is in contact with the resin layer, and reinforces the resin layer,
    wherein the resin layer forms at least a portion of the inner circumferential surface,
    the reinforcing layer has end portions of the inner circumferential surface on two sides in a rotation axis direction of the shaft, and
    the inner circumferential surface included in the resin layer is sandwiched by the end portions.

2. The internal combustion engine bearing according to claim 1, wherein the resin layer covers an entirety of a surface of the reinforcing layer.

3. The internal combustion engine bearing according to claim 1,
    wherein the bearing main body is formed with a semicircular tube shape and has a mating surface that is to come into contact with another bearing that forms a pair, and
    the reinforcing layer is exposed at the mating surface.

4. An internal combustion engine bearing comprising:
    a bearing main body formed with a semicircular tube shape or a circular tube shape and having an inner circumferential surface that is to slide over a shaft and an outer circumferential surface that is to come into contact with a housing,
    wherein the bearing main body has
        a resin layer that is made of a resin, and
        a reinforcing layer that is made of a metal, is in contact with the resin layer, and reinforces the resin layer,
    wherein the resin layer forms at least a portion of the outer circumferential surface,
    the reinforcing layer has end portions of the outer circumferential surface on two sides in a rotation axis direction of the shaft, and
    the outer circumferential surface included in the resin layer is sandwiched by the end portions.

5. The internal combustion engine bearing according to claim 4,
wherein the bearing main body is formed with a semicircular tube shape and has a mating surface that is to come into contact with another bearing that forms a pair, and
the reinforcing layer is exposed at the mating surface.

6. The internal combustion engine bearing according to claim 4, wherein the resin layer covers an entirety of a surface of the reinforcing layer.

* * * * *